126,195

UNITED STATES PATENT OFFICE.

PERRY FINLEY, OF NEW YORK, N. Y.

IMPROVEMENT IN ENAMELING AND COATING ARTICLES WITH RUBBER, GUTTA-PERCHA, &c.

Specification forming part of Letters Patent No. 126,195, dated April 30, 1872.

*To all whom it may concern:*

Be it known that I, PERRY FINLEY, of the city, county, and State of New York, have invented a new and useful Improvement or Process in the Preparation and Manufacture of India Rubber and Gutta-Percha, and producing therefrom a hard coating or enamel to the surfaces, metallic or otherwise, to which the same may be applied.

The nature and object of this invention consist in so treating and preparing India rubber that it shall be reduced to either a melted, plastic, or dissolved state, and applied as a coating or enamel, and in vulcanizing or hardening the same with heat alone, without the the use of sulphur or other vulcanizing agent.

To enable others skilled in the art to make, use, and produce this process or invention, and apply the same, I will proceed to describe such method or process.

This India rubber or gutta-percha is first submitted to a high degree of artificial heat, for the purpose of affecting its qualities and to reduce the same to either a melted or dissolved state, separate and preparatory to its application as a coating or enamel. To accomplish this result I prefer for such purpose a closed vessel or still, in order that the volatile oil escaping from the gum during the process of melting may be saved for use; or such closed vessel or still may be placed on a sand-bath, or surrounded by a steam-jacket, in which the gum may be placed and the cover closed. The gum should be melted over a slow fire, or subjected to a carefully-regulated heat to prevent scorching or injury to the same, until the gum is converted into a plastic or fused state. This operation may be facilitated by the addition of one or more of the following substances: caoutchoucine, naphtha, or linseed-oil, in about the proportion of one-third of these ingredients to two-thirds of gum. The degree of heat required for melting the rubber or gutta-percha may be varied from 240° to 400° and upward of Fahrenheit; but I prefer a heat ranging from 240° to 320°. When the India rubber or gutta-percha is thus reduced to a melted or plastic state, it will be found to have acquired new properties, and upon its application in such a condition to metallic or other surfaces, to be susceptible of vulcanizing or hardening upon exposure to a high degree of artificial heat without the admixture of sulphur or other hardening ingredient.

When such gum is thinned and applied as a coating, enamel or japan, to the surface of any suitable material, and hardened by heat, it possesses all the useful and beautiful qualities of the best vulcanized India rubber or gutta-percha, and even in a superior degree, as it may be made of entirely pure gum without any admixture whatever of sulphur or other hardening ingredient.

When the India rubber or gutta-percha is thus melted, it will be found in a thick fluid or semi-fluid state, and about the consistency of thick tar, and in that condition requires only thinning to render it fit for use. To accomplish this, I employ for such purpose naphtha, turpentine, caoutchoucine, linseed-oil, or other solvent of India rubber, and reduce the same to about the consistency of paint or japan, to make it suitable and in a condition to apply to the purpose herein mentioned by means of a brush, dipping, or pouring. The material prepared in this way will, when vulcanized or hardened by heat, produce a coating or enamel of pure caoutchouc or gutta-percha, having all the valuable qualities and hardness of the best vulcanized India rubber or gutta-percha.

For the purposes of utility or economy (or if desired of imparting a suitable polish) one or more of the following substances are added in the proportion of from one to sixteen ounces to the pound of India rubber or gutta-percha, viz.: graphite, feldspar, ground slate, gas carbon, ground silex, charcoal, sulphate or carbonate of lime, magnesia, gum animé, asphaltum, gum copal, gum-shellac, and linseed-oil. To obtain a suitable color for such coating or enamel, I mix with the India rubber or gutta-percha any of the following colors: vermilion, sulphide of cadmium, the oxides of zinc, antimony, or iron, or any coloring-matter that will bear the necessary degree of heat, to which the surfaces so coated or enameled are submitted to produce vulcanization or hardening. The India rubber or gutta-percha, when thus melted and reduced to a consistency of paint or japan, may be applied as a coating or enamel by means of a paint or varnish brush, or by dipping the material to be so coated or enameled into the mixture. After such application the surfaces or material so coated, &c., are subjected to a high degree of artificial heat, not less than from 212° to 320° of Fahrenheit's scale, in an oven or other heater, and kept there from one to twelve hours, or for such time as the coating or enamel has become vulcanized or attained the required degree of hardness.

By this invention a new substance or material is produced for the purposes of coating, enameling, or japanning metallic or other surfaces, and will be found to possess many valuable qualities useful in the arts, and susceptible of being applied upon any substance or surface that will withstand the necessary degree of heat required during the process of vulcanizing or hardening such coating or enamel.

I do not claim, broadly, the process of melting India rubber or gutta-percha, as this has been done before, but not for the purpose of producing the results and manufacture as herein described.

What I claim as my invention, and desire to secure by Letters Patent, is—

1. The within-described process of melting, dissolving, or fusing India rubber or gutta-percha by heat alone, to form a coating or enamel for metallic or other surfaces, and vulcanizing or hardening the surfaces so coated by the further application of heat.

2. The within-described method or process of coloring India rubber or gutta-percha (free from sulphur) when the same is prepared and applied as a coating or enamel to or upon metallic or other surfaces.

3. The within-described method or process of imparting utility, economy, and polish by the admixture of the ingredients herein specified with India rubber or gutta-percha, when the latter is applied to metallic and other surfaces, and prepared in the manner and for the purpose herein set forth.

4. The new substance or manufacture herein described, possessing the substantial qualities described, and composed of India rubber or other allied gums, and, when prepared and applied, subjected to a high degree of heat, in the manner and for the purpose specified.

PERRY FINLEY.

Witnesses:
 JAMES S. GRINNELL,
 CHAS. C. WILSON.